United States Patent [19]
Bernhard

[11] Patent Number: 6,000,419
[45] Date of Patent: Dec. 14, 1999

[54] CONNECTION SYSTEM FOR A PRESSURE CYLINDER

[75] Inventor: Ernst Bernhard, Aegerten, Switzerland

[73] Assignee: Carbagas, Liebefeld, Switzerland

[21] Appl. No.: 08/817,191

[22] PCT Filed: Oct. 12, 1995

[86] PCT No.: PCT/CH95/00234

§ 371 Date: May 28, 1997

§ 102(e) Date: May 28, 1997

[87] PCT Pub. No.: WO96/12137

PCT Pub. Date: Apr. 25, 1996

[30]     Foreign Application Priority Data

Oct. 14, 1994  [CH]  Switzerland ............................. 3088/94
Nov. 24, 1994  [CH]  Switzerland ............................. 3547/94

[51] Int. Cl.⁶ ................................................. F16L 37/28
[52] U.S. Cl. ................... 137/15; 137/322; 137/614.05; 285/320
[58] Field of Search ............................. 137/614, 614.04, 137/614.05, 322, 15; 205/320

[56]                References Cited

U.S. PATENT DOCUMENTS

| | | |
|---|---|---|
| 2,309,869 | 2/1943 | Rugh . |
| 4,331,175 | 5/1982 | Brake et al. . |
| 4,736,926 | 4/1988 | Fallon et al. ............................. 137/322 |
| 4,763,690 | 8/1988 | Martin ..................................... 137/613 |
| 4,795,202 | 1/1989 | Mader . |
| 5,080,414 | 1/1992 | Hellquist et al. . |
| 5,150,880 | 9/1992 | Austin, Jr. et al. ................. 137/614.05 |
| 5,586,748 | 12/1996 | Kish .................................... 137/614.05 |

FOREIGN PATENT DOCUMENTS

| | | |
|---|---|---|
| 974556 | 9/1975 | Canada . |
| 1225635 | 7/1960 | France ............................... 137/614.05 |
| 2410210 | 6/1979 | France . |

Primary Examiner—A. Michael Chambers
Attorney, Agent, or Firm—Tarolli, Sundheim, Covell, Tummino & Szabo L.L.P.

[57]              ABSTRACT

A connection system for a pressure cylinder (5) comprises a check valve (4) located in the neck (15) of the pressure cylinder (5) and which is equipped with a gas removal connection opening and can be operated from the outside by means of a valve tappet displaceable along a central axis (6), as well as a connecting device (2), which is connectable in gastight, detachably locking manner with the check valve (4) and contains means for valve tappet operation. In such a connection system an easy and rapid replacement or connection of cylinders is made possible, whilst leading to a high security against incorrect operation and faults and reliable handling and storage of the cylinders in that the pressure cylinder (5) with the check valve (4) and connecting device (2) are mechanically couplable in a common pivoting axis (34) located at right angles to and outside the central axis (6) and in the coupled state are connectable by a pivoting relative to one another about the pivoting axis (34).

19 Claims, 7 Drawing Sheets

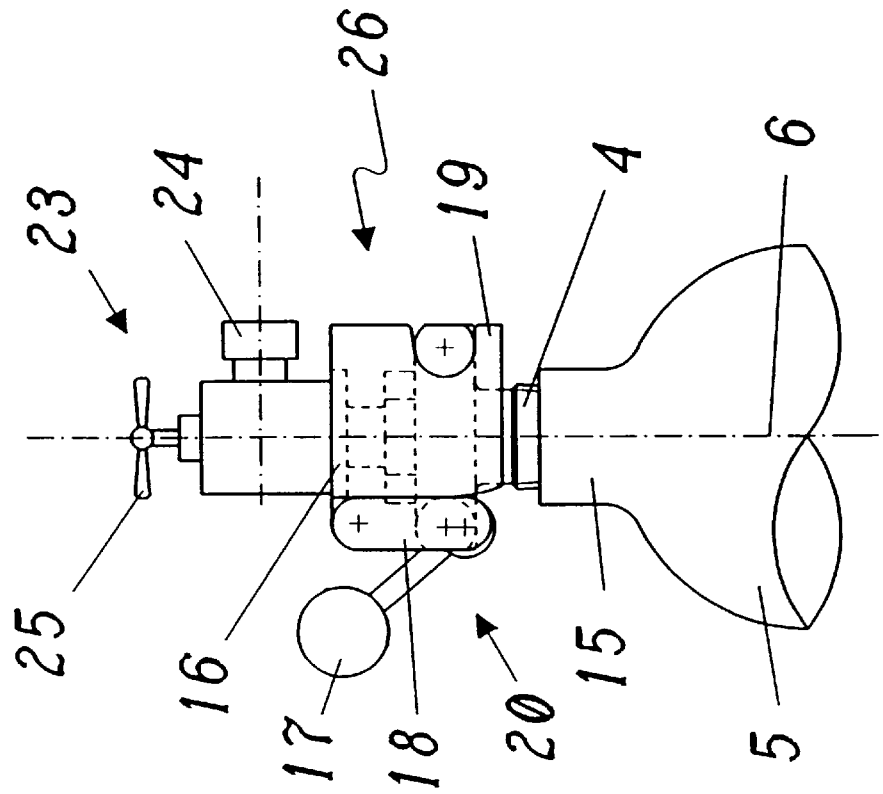
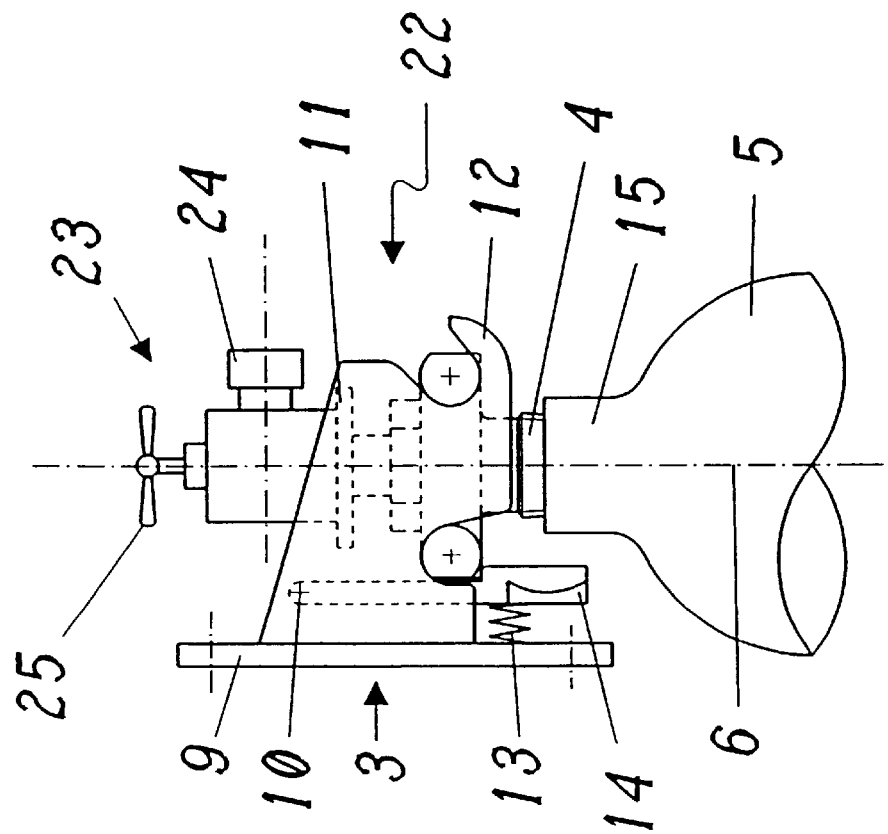
FIG. 3
FIG. 4

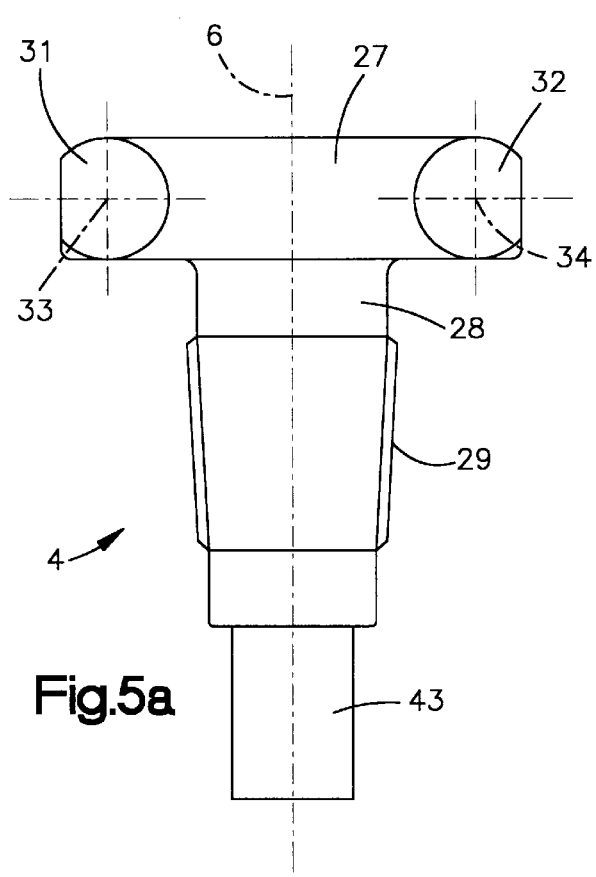
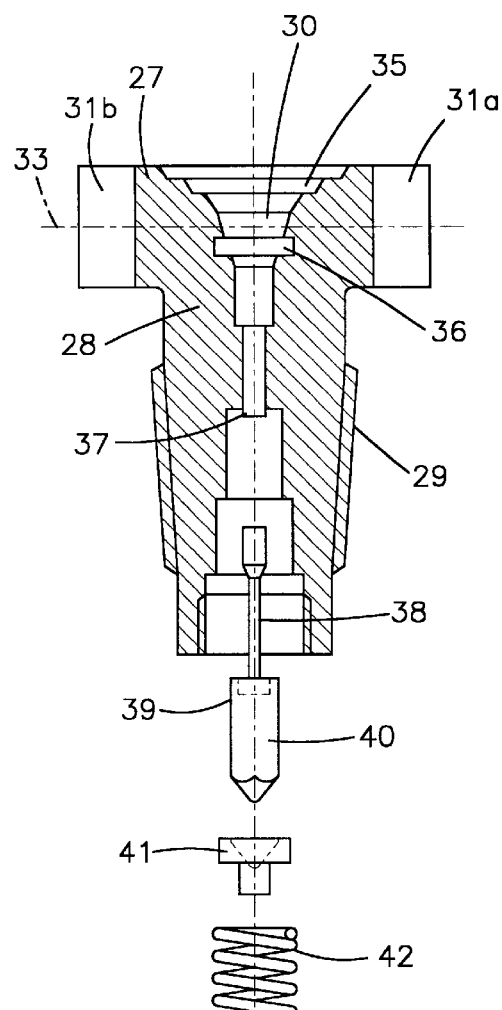
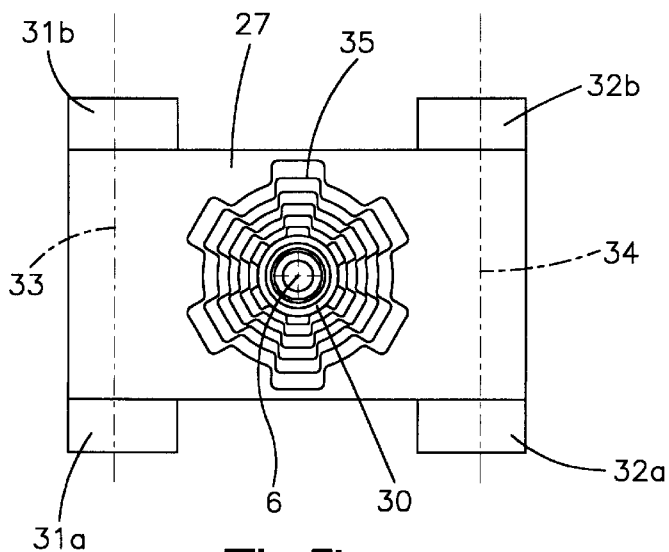
Fig.5a
Fig.5b
Fig.5c

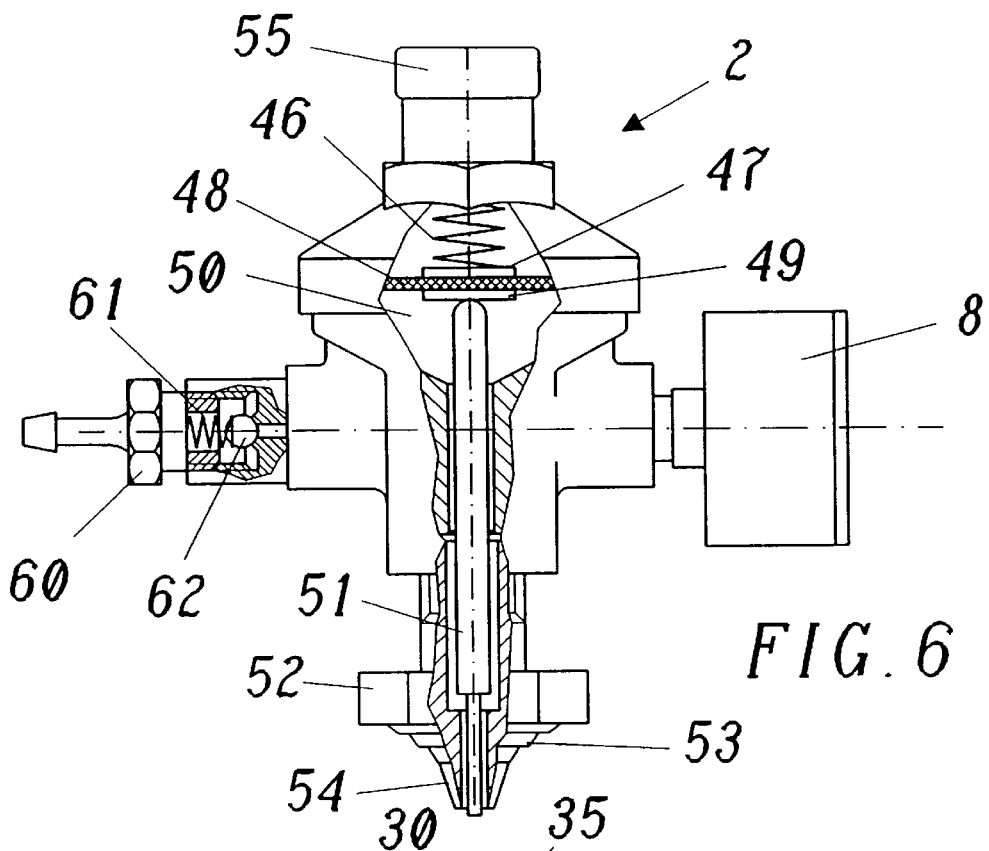
FIG. 6
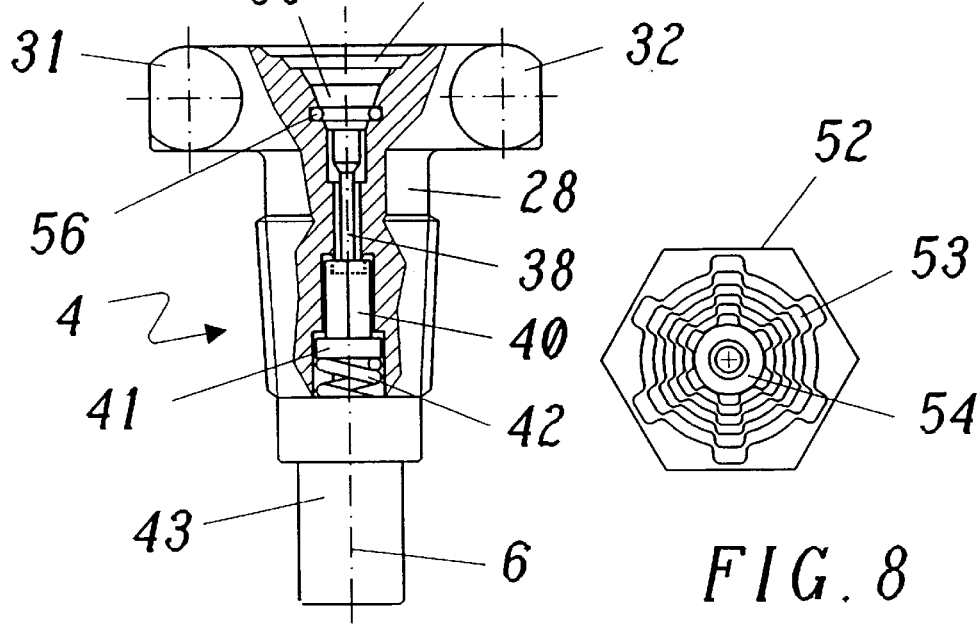
FIG. 7
FIG. 8

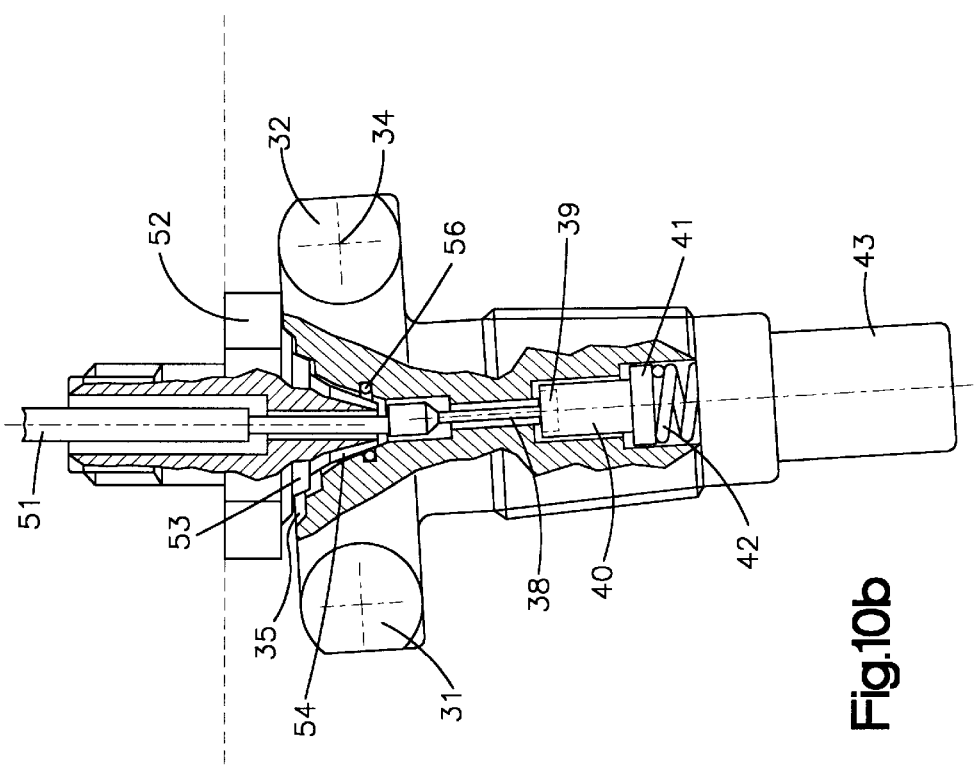
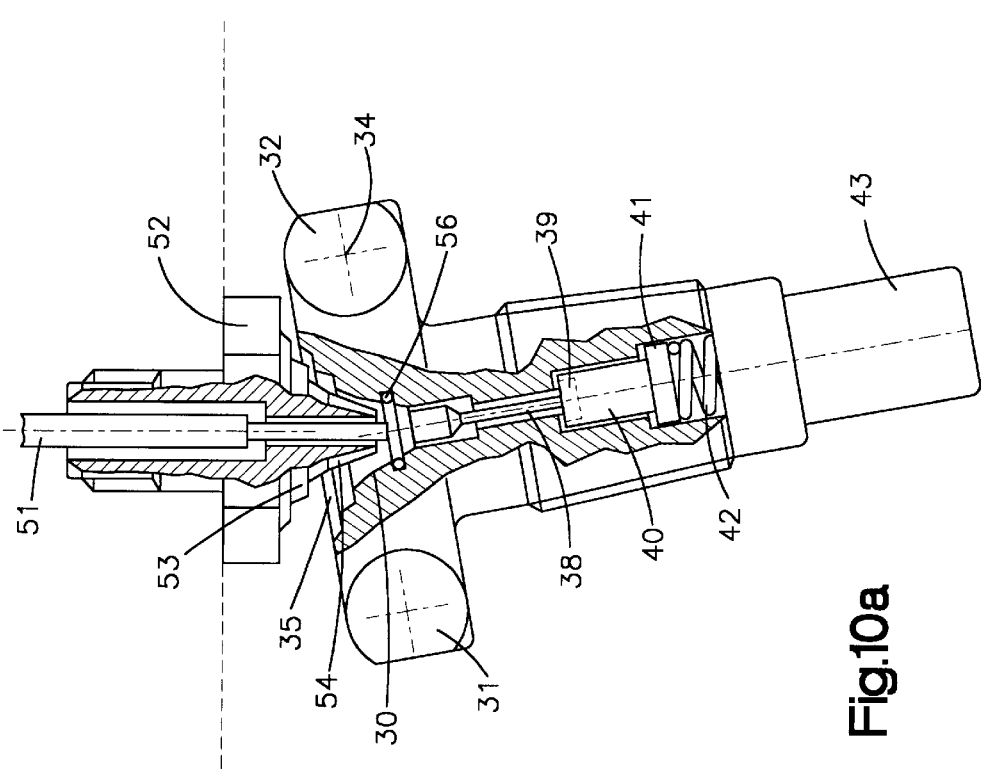

CONNECTION SYSTEM FOR A PRESSURE CYLINDER

TECHNICAL FIELD

The present invention relates to the field of pressurized gas technology. It concerns a pressure cylinder having a check valve placed in a neck of the pressure cylinder and which is equipped with a connection opening for gas removal and is operable from the outside by means of a valve tappet displaceable along a central axis, as well as a connecting device, which is connectable in gastight, detachably locking manner with the check valve and contains means for operating the valve tappet.

Such a connection system is e.g. known from EP-A2-108 972.

PRIOR ART

In many fields the most varied gases are now used, but for the replacement of emptied cylinders or bottles trained personnel is not always available. As an example reference is made to the preparation of drinks in gastronomy or the supply of patients in the medical sector with life-necessary or other important gases (oxygen, nitrous oxide, etc.). Particularly in medicine, the health and even life can be a function of whether the correct gas cylinder can be connected in a short time.

The presently conventional connection system in such fields consists of a tap or cock with threaded connection for a pressure reducing valve or a gas line. The tap operates by means of a spindle and valve bell with seal against the pressure in the cylinder. The connection threads are standardized. However, the number thereof is limited, so that there are only inadequate possibilities for carrying out a coding of the connection systems on the basis of different gas types. It is also generally necessary to tighten a cap nut, for which purpose in almost all cases a large wrench is needed. Another problem is that there are left and right-hand threads, which on connecting the cylinder must firstly be identified, which leads to a loss of time. In addition, a considerable force expenditure is necessary for opening the tap when the spindle no longer functions easily.

The aforementioned document already proposes a connection system, which is particularly suitable for flammable liquefied petroleum gases. In this known system the pressure cylinder is equipped with a cylinder valve constructed as a check valve and on which can be slipped in a sealing, lockable manner a control valve. On slipping on, a control pin located in the control valve operates the check valve, so that a rapid connection is obtained.

However, the known connection system suffers from various disadvantages:

There is no special coding of the connection and this cannot be readily supplemented.

Due to the lack of guidance between the slip-on valve and gas cylinder valve, the connection process must be performed relatively carefully, so that the control valve is correctly seated on the gas cylinder valve.

A relatively high force expenditure is necessary for slipping on the control valve.

The system is more particularly suitable for fixed, standing pressure cylinders on which the control valve is slipped, so that a secure retention of the cylinders is not obtained, which can lead to problems with the small pressure cylinders or bottles conventionally used in medicine and gastronomy.

The check valve installed in fixed form on the cylinder is located above the screw-in thread, so that e.g. if the cylinder falls over, the cylinder valve is sheared and the cylinder content escapes in an unimpeded manner, which can lead to significant safety risks.

DESCRIPTION OF THE INVENTION

The problem of the invention is to provide a connection system for pressure cylinders, which allows an easy and rapid replacement or connection of the cylinders, ensures high security against faulty operation and incidents, permits safe handling and storage of the cylinders and makes available numerous coding possibilities.

In the case of a connection system of the aforementioned type, this problem is solved in that the pressure cylinder is mechanically couplable with the check valve and the connecting device in a common pivoting axis positioned transversely to and outside the central axis and are connectable in the coupled state by pivoting relative to one another about the pivoting axis.

Through the mechanical coupling of the connecting device and check valve in one pivoting axis, firstly a fixed association is obtained between the two parts of the system, so that during the subsequent pivoting the pivoted part is reliably guided. Due to the fixed pivoting axis there is no possibility of the two parts rotating against one another about the central axis, which leads to numerous coding possibilities. If, particularly in the case of a fixed connecting device, the pivoting movement is performed by the pressure cylinder, the momentum of the heavy cylinder can be utilized in order to bring about the gastight connection with limited force being expended.

According to a first embodiment of the connection system according to the invention, the check valve has a screw-in cone concentric to the central axis and by means of a conical thread located on the screw-in cone can be screwed into the pressure cylinder neck, that on the outer end of the screw-in cone is shaped a substantially rectangular connection plate at right angles to the central axis and on whose top is provided the connection opening, that the pivoting axis is defined by a pair of spigots, which are shaped onto two opposite sides of the connection plate and that on the connection plate are shaped two pairs of spigots, which define two arbitrarily usable pivoting axes, which are positioned symmetrically to a median plane passing through the central axis.

With the aid of one spigot pair the pressure cylinder provided with the check valve can be easily hung in a fixed mounting and can be pivoted in the hung-in state. The other spigot pair is then particularly appropriate in the pivoted state for guiding and locking the connection. The symmetrical arrangement of the spigot pairs ensures that the cylinders can be readily connected even on rotating by 180° about the central axis, because the two spigot pairs then simply transpose their function.

A second preferred embodiment of the connection system according to the invention is characterized in that the connection opening is constructed as an outwardly opening cone concentric to the central axis, that in the wall of the opening cone is provided a concentrically passing round packing ring and that the connecting device has a gas removal head, which in its front region is constructed as a plug cone matching the opening cone and on connecting the check valve and connecting device fitting in sealing manner in the opening cone.

This makes it possible on pivoting the two equipment parts (connecting device and check valve) relative to one another to bring about a seal to the outside before reaching the end pivoting position. This reliably avoids a gas escape to the outside during the connection process, even if the check valve automatically opens during connection through the valve tappet operating means.

A further improved embodiment of the invention is characterized in that on the check valve and connecting device are provided coding means, which allow a correct connection of the gas cylinder and connecting device only in the case of pressure cylinders matching said connecting device and that the coding means comprise a concavely toothed inner shape arranged concentrically to the central axis in the vicinity of the connection opening and a matching, convexly toothed outer shape located in the vicinity of the gas removal head. Due to the non-rotary association between the check valve and the connecting device, after mechanical coupling has taken place, this type of coding creates numerous coding possibilities.

Another preferred embodiment is characterized in that the connecting device comprises a reducing valve with a spring-loaded diaphragm, that the means for operating the valve tappet comprise a push rod subject to the action of the diaphragm and which on connecting the check valve and connecting device acts on the valve tappet, that the connecting device comprises a fixed fittable wall mounting for receiving a pressure cylinder equipped with the check valve and to which is resiliently fixed the reducing valve, that the check valve comprises a screw-in cone concentric to the central axis and can be screwed by means of a conical thread located on the screw-in cone into the pressure cylinder neck, that at the outer end of the screw-in cone is shaped a substantially rectangular connection plate at right angles to the central axis and on whose top is located the connection opening, that the pivoting axis is defined by a pair of spigots, which are shaped onto two opposite sides of the connection plate, that the wall mounting comprises two parallel support arms, which have on their free ends hang-in openings in which can be hung the connection plate with its spigots and in which hang-in openings the connection plate can be pivoted about the pivoting axis defined by the spigots.

In this embodiment the cylinder is hung in the hang-in openings and is securely retained there prior to the final connection. Through a slight pivoting, which is aided by the weight of the cylinder, it is possible in a reliable and easy manner to establish the connection, the opening of the check valve taking place automatically through the push rod subject to the action of the reducing valve. In the same way, on replacing cylinders in the reverse order the connection can initially be released by pivoting back without it being necessary to hold the cylinder, which is still hanging in the support arms.

Further embodiments can be gathered from the dependent claims.

BRIEF EXPLANATION OF THE DRAWINGS

The invention is described in greater detail hereinafter relative to embodiments and the attached drawings, wherein show:

FIGS. 1 to 4 Various preferred embodiments for a connection system according to the invention with reducing valve and manual operating device and fixed installed wall mounting and mobile mounting.

FIG. 5 Various views of the outer design (a, b) and inner design (c) of the screwable check valve of FIGS. 1 to 4.

FIG. 6 The exemplified construction of the reducing valve of FIGS. 1 and 2 with the screwed in gas removal head.

FIG. 7 The check valve of FIG. 5 in the assembled state prior to connection to the reducing valve of FIG. 6.

FIG. 8 The gas removal head of FIG. 6 with the coding elements in a view from below.

WAYS TO IMPLEMENT THE INVENTION

The connection system according to the invention can be fundamentally used with advantage in the most varied functions and variants and the same connection parts can always be used on the cylinder or bottle side. Four possible variants are shown in exemplified manner in FIGS. 1 to 4.

Figure 1:
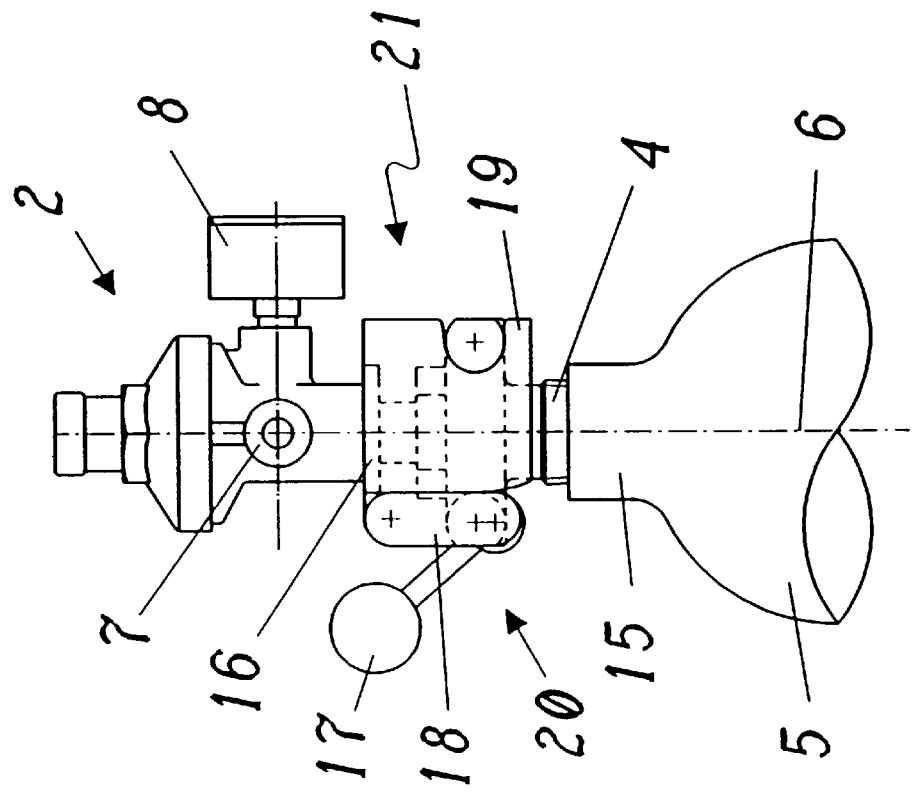
Figure 2:
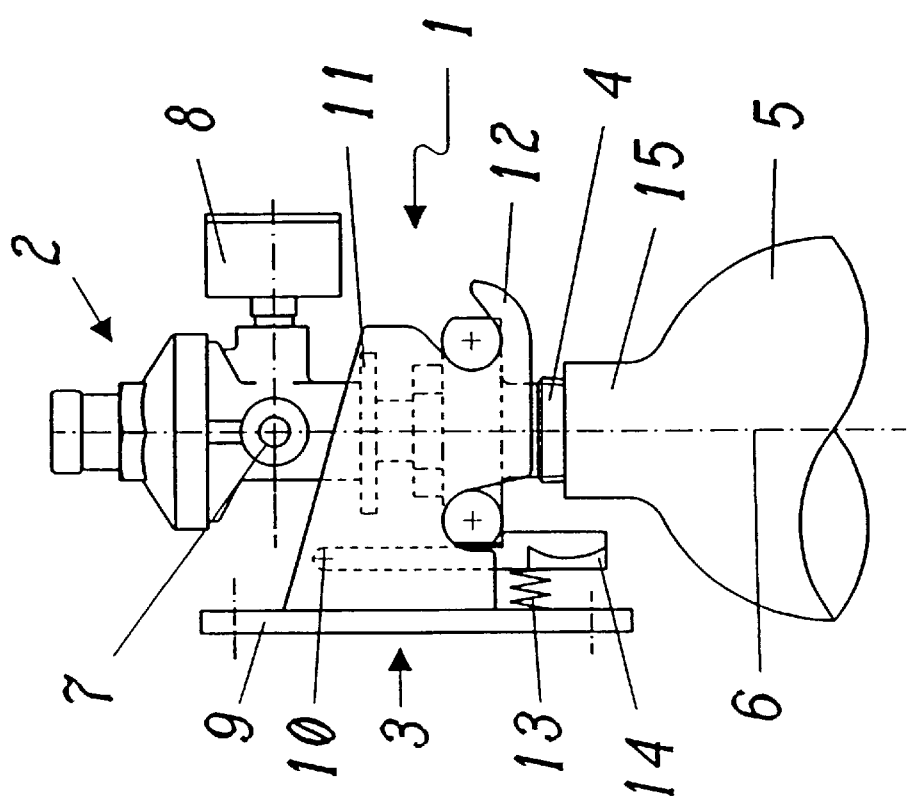

FIGS. 1 and 2 show a connection system 1 or 21 with precontrolled pressure connection and which is more particularly suitable for liquefied petroleum gases, in which the cylinder pressure provides no or only little information on the residual content, or for highly compressed gases, where no residual pressure indication is required. The pressure cylinder 5 comprises a check valve 4 screwed into the cylinder neck and which is connected to a reducing valve 2. A spring (46 in FIG. 6) in the reducing valve 2 opens the check valve 4 on connection by means of a push rod (51 in FIG. 6). When the set pressure has been reached, the spring 46 is compressed by the diaphragm (48 in FIG. 6), so that the push rod 51 moves back and the check valve closes again. It is also possible to provide on the reducing valve 2 a pressure gauge 8 and an overpressure valve 7. Connection takes place in a central axis 6.

In the case of smaller pressure cylinders or bottles 5, according to FIG. 1 a wall mounting 3 is provided, which can be firmly screwed to the wall or directly in an appliance by means of a fastening plate 9. To the fastening plate 9 are fitted two parallel, plate-like support arms 12 (in FIG. 1 only the front support arm is visible), being interconnected by a transversely interposed support plate 11. The reducing valve 2 is resiliently fixed to the support plate 11 with its bottom, here not shown gas removal head (52 in FIG. 6). The support arms 12 have hang-in openings (58 in FIG. 9a) and locking openings (57 in FIG. 9a), in which the pressure cylinder 5 is hung with spigots (31a, b; 32a, b in FIG. 5b) shaped onto the top of the check valve 4 and which by slight pressure can be latched or locked towards the wall. In the locking position the cylinder is secured by a ratchet lever 14, which is pivotably mounted about a pivoting axis 10 on the support arms 12 and is pretensioned by a spring 13. The empty pressure cylinder 5 is released by slight pressure against the ratchet lever 14. It remains in the hung-in state and is consequently secured against dropping down. In the latched or locked state no further securing of the cylinder is required (by chains or the like), as is necessary in conventional connection systems.

The mobile connection according to FIG. 2 is mainly provided for large pressure cylinders. It comprises a mobile mounting 20 with two parallel forks 19, between which is positioned a support plate 16 for fixing the reducing valve 2. On connection the mounting 20 is hung with the forks 19 sloping over the two right-hand spigots (31a, b in FIG. 5b) on the check valve 4 and is downwardly latched. Here again locking also takes place on the two other spigots (31a, b in FIG. 5b) by means of a toggle lever system, which comprises an operating lever 17 and a stop lever 18.

FIGS. 3 and 4 show a connection system according to the invention with direct pressure connection and which can more particularly be used for highly compressed gases with residual pressure indication or for line connections with unreduced pressure. In place of a reducing valve in this case a manual operating device 23 is provided, by means of which the check valve 4 can be opened by means of a spindle 25 or a push rod. On the manual operating device 23 is provided a gas removal connection 24, to which can also be fitted a conventional pressure reducing valve. As in the embodiments according to FIGS. 1 and 2, as desired, it is possible to use here the wall mounting 3 (FIG. 3) or the mobile mounting 20 (FIG. 4).

The external design and internal construction of the check valve 4, which can be screwed into the pressure cylinder 5, can be gathered from FIG. 5, the partial FIGS. (a) and (b) being a side or plan view and partial FIG. (c) shows in exploded form the longitudinal section. The check valve 4 comprises a screw-in cone 28 with an externally fitted, conical thread 29, which is adapted to the internal thread in the neck 15 of the pressure cylinder 5. Onto the upper end of the screw-in cone 28 is shaped a substantially rectangular connection plate 27 at right angles to the central axis 6.

On the top of the connection plate 27 is provided a connection opening 30, which is constructed as an outwardly opening cone concentric to the central axis 6. In the wall of the opening cone is provided a concentrically passing round sealing groove 36, which receives an O-ring (56 in FIG. 7) as the seal. The coding means is constituted by a concavely toothed inner shape 35 arranged concentrically to the central axis 6 in the vicinity of the connection opening 30 and which on connecting the pressure cylinder 5 engages with a matching, convexly toothed outer shape 53 (FIGS. 6 and 8), located in the vicinity of the gas removal head 52. The tooth system of the inner shape 35 and outer shape 53 extends on three planes, which are at different heights. As the tooth system on each plane can be independent of the other planes, in combination numerous coding possibilities are provided.

On the connection plate 27 are shaped two pairs of spigots 31, 32 and 31a, b; 32a, b, which are constructed as pivot pins and define two randomly usable pivoting axes 33, 34, which are arranged symmetrically to a median plane passing through the central axis 6. Each of the pivoting axes 33, 34 can be equivalently used in order to hang the pressure cylinder 5 in a mounting according to FIGS. 1 or 3 and to pivot about said axis during the connection process, because the check valve 4, including the coding means 35 is invariant with respect to a 180° rotation. This significantly facilitates the connection of the pressure cylinder 5.

The actual valve in the interior of the check valve 4 is formed by a valve seat 37, which can be closed by a valve seal 39 (FIG. 5c). The valve seal 39 is placed in the top of a valve body 40, which preferably has a rectangular crosssection, in order to ensure an unhindered gas passage in the case of simultaneous lateral guidance. At the top the valve body 40 passes into a valve tappet 38, which permits an operation of the valve from the connection opening 30. The valve tappet 38 is hardened and extends from above into the vicinity of the conical thread 29. Thus, in the case of an accident-caused shearing of the check valve 4 on the cylinder neck 15 the valve tappet 38 is torn off without the sealing function of the valve 37, 39, 40 being lost.

By means of an adaptor 41 the valve body is subject to the action of the pressure of a spring 42, which is supported in the blind hole of a filter housing 43 screwed in from the bottom. In the filter housing 43 is preferably housed a sintered metal filter cartridge 44 and is secured by means of a locking screw 45. In the assembled state, the check valve 4 has the construction shown in FIG. 7.

The counterpart to the check valve 4 in the connection system of FIGS. 1 and 2 is constituted by the reducing valve 2 with the gas removal head 52 screwed into the bottom in accordance with FIG. 6. The upper part of the reducing valve 2 houses the diaphragm 48, which separates the pressure area 50 from the environment. The diaphragm 48 is centrally provided on either side with washers 47, 49. The pressure of a spring 46 brings about application to the upper washer 47 and said spring can be adjusted by a setscrew (not shown in FIG. 6) hidden under a cover 55. With the other washer 49 the diaphragm acts on a push rod 51, which passes downwards in the central axis through the reducing valve 2 and the screwed in gas removal head 52 and projects there to such an extent that on connecting the check valve 4 it can act in the aforementioned manner on the valve tappet 38. The front region of the gas removal head 52 is constructed as a plug cone 54 matching the opening cone 30 and on connecting check valve 4 and reducing valve 2 sealingly fits in the opening cone. The external shapes 53 (FIGS. 6 and 8) surrounding the plug cone 54 match the internal shapes 35 and together therewith form the coding means.

On the side of the reducing valve 2 opposite to the pressure gauge 8 is located a gas removal connection 60 (omitted for reasons of simplicity in the other drawings), which contains a line check valve 62 pretensioned by a spring 61. On emptying the gas cylinder, a small residual pressure is left behind in the cylinder due to the resistance of the line check valve 62 and this is required with many cylinders by the manufacturer. The line check valve 62 prevents the flowing back of gas, air or water into the cylinder, so that a contamination or (in the case of water) a corrosion of the cylinder is reliably prevented.

Figure 9A:
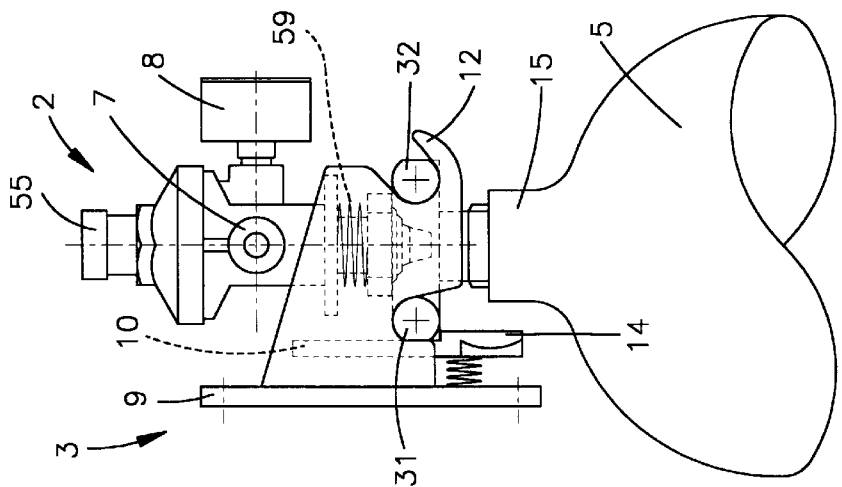
FIG. 9 Various phases (a–c) during the connection of the connection system according to FIG. 1 (viewed from the outside).
Figure 9B:
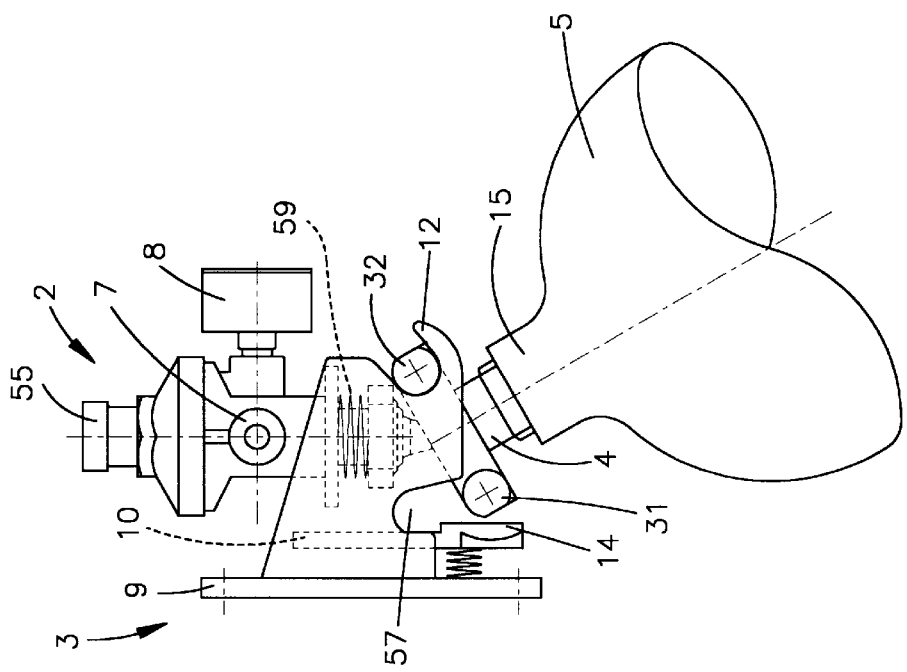

The different phases of the connection process in a connection system according to the embodiment of FIG. 1 are shown in FIG. 9. Firstly the pressure cylinder 5 and connection device 2, 3 have no mechanical coupling (FIG. 9a). The connection process begins in that the cylinder 5 with one spigot pair 32 is hung into the hang-in openings 58 in the support arms 12 of the wall mounting 3 (FIG. 9b). The cylinder assumes in the hung-in state a secure inoperative position, in which the cylinder gravity is perpendicular to the rotation axis 34 in the spigot pair 32. The pressure cylinder 5 and wall mounting are in this way mechanically coupled together and form a pivoting system with the pivoting axis 34.

Figure 9C:
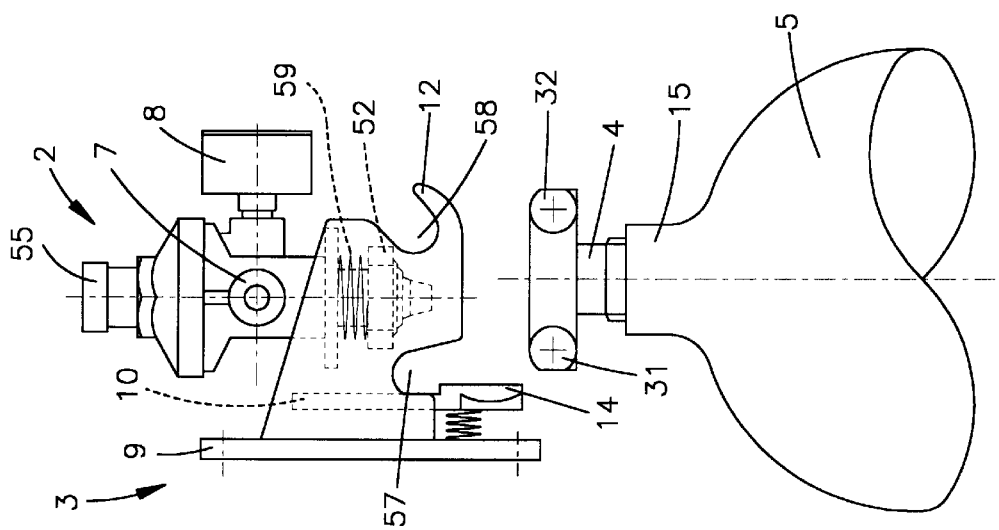

The pressure cylinder 5, by slight pressure in the direction of the wall, can then be pivoted about the pivoting axis 34 to such an extent that the other spigot pair 31 comes into locking engagement with the ratchet lever 14 (FIG. 9c). This is only possible if the internal shape 35 and external shape 53 of the coding means coincide. The reducing valve 2 is resiliently mounted on the support plate between the support arms 12 by means of a spring 59, preferably in the form of a set of disk springs. When the cylinder is hung in said spring 59 is slightly compressed by approximately 0.4 mm counter to the pretension thereof. This ensures that the gas removal head 52 is always pressed onto the stop face on the connecting plate 27. If an incorrectly coded cylinder is hung in, none of the connection parts are damaged. As the external shape 53 and internal shape 35 do not match, the spring 59 is merely more strongly compressed by approximately 1.5 mm. The length of the push rod 51 is no longer sufficient to operate the check valve tappet 38.

If the pressure of a connected pressure cylinder 5 drops to the level in the pressure area 50, the diaphragm 48 is forced downwards by the spring 46. Thus, the push rod 51 moves downwards and completely opens the check valve 4. As stated hereinbefore, due to the line check valve 62, a small residual pressure is left in the cylinder. The cylinder can now be unlocked for replacement purposes by pressure on the button on the ratchet lever 14. After unlocking, it still hangs on the right-hand spigot pair 32 in the hook-like hang-in openings 58 of the support arms 12. It can be removed without exerting any force and replaced by a new cylinder.

Figure 10C:
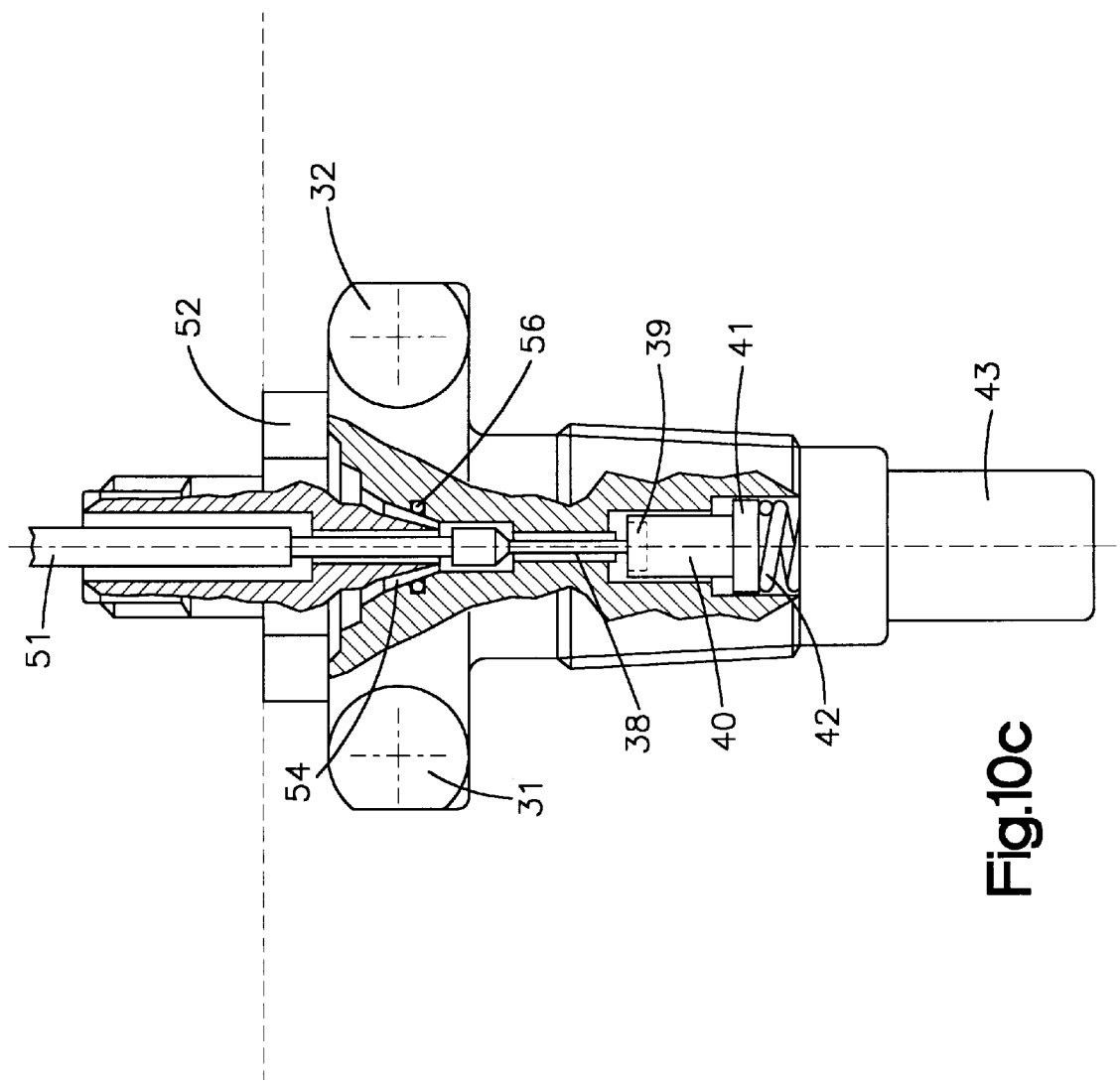
FIG. 10 Various phases (a–c) on connecting the connection system according to FIG. 1 in a sectional representation.

The interplay of the inner parts of the check valve and the gas removal head 52 on connection is shown for the different connection phases in FIG. 10. In FIG. 10(a) the not shown cylinder with the check valve is already hung in the mounting and pivoted to the left about the pivoting axis 34. Both the coding means 35, 53, the connection opening 30 and plug cone 54, as well as the push rod 51 and valve tappet 38 are not yet in engagement. If the cylinder is pivoted further to the left (FIG. 10(b)), the plug cone 54 moves into the vicinity of the O-ring 56 and seals the connection to the outside without the push rod 51 pressing on the valve tappet 38 and the check valve already opens. Only if the pivoting is continued up to the stop member (FIG. 10(c)), is the valve tappet 38 forced downwards by the push rod 51 and the valve on the cylinder is opened.

Comparable connection processes occur if, in place of the wall mounting 3, the mobile mounting 20 is used. However, when using the manual operating device 23 the check valve 4 is not automatically opened and instead this takes place after connection by operating the spindle 25.

The invention leads to a connection system which gives rise to numerous advantages:

- the system permits a rapid cylinder change without using a tool,
- the wall mounting permits a direct fitting in an appliance or the fixing of pressure cylinders of up to approximately 15 kg directly to a wall,
- with the mobile mounting, as desired, free standing cylinders can be connected,
- as desired, wall mountings or mobile mountings with integrated reducing valve can be operated as precontrolled connections or without an integrated reducing valve with existing pressure reducing valves,
- an integrated line check valve in the gas removal connection prevents the flowing back of gas or liquids (e.g. beverage in beverage preparation) and thereby protects the cylinder or bottle against dirtying or corrosion,
- the line check valve prevents a complete emptying of the cylinder,
- integrated coding means permit the use of numerous (more than 126) codes, with the aid of which different gases can be filled and used in error-proof manner,
- through the coding exclusive connections can be produced, whilst unauthorized gas removal and filling can be prevented,
- the pressure cylinders can be automatically filled by means of the integrated check valve,
- breakage prevention prevents an outflow of gas, if the upper part of the check valve (the part projecting from the cylinder neck) is broken off by dropping or is knocked off.

LIST OF REFERENCE NUMERALS 1, 21 Connection system
2 Reducing valve
3 Wall mounting
4 Check valve
5 Pressure cylinder
6 Central axis
7 Overpressure valve
8 Pressure gauge
9 Fastening plate
10 Pivoting axis (ratchet lever)
11, 16 Support plate
12 Support arm
13 Spring
14 Ratchet lever
15 Cylinder neck
17 Operating lever
18 Locking lever
19 Fork
20 Mobile mounting
22, 26 Connection system
23 Manual operating device
24 Connection
25 Spindle
27 Connection plate
28 Screw-in cone
29 Thread
30 Connection opening
31; 31a, b/
32; 32a, b Spigot
33, 34 Pivoting axis
35 Internal shape (concavely toothed)
36 Sealing groove
37 Valve seat
38 Valve tappet
39 Valve seal
40 Valve body
41 Adaptor
42 Valve spring
43 Filter housing
44 Filter cartridge (sintered metal)
45 Locking screw
46 Spring
47, 49 Washer
48 Diaphragm
50 Pressure space
51 Push rod
52 Gas removal head
53 External shape (convexly toothed)
54 Plug cone
55 Cover
56 O-ring
57 Locking opening
58 Hang-in opening
59 Spring
60 Gas removal connection
61 Spring
62 Line check valve

I claim:

1. Connection system for a pressure cylinder, comprising:
   a check valve with a first central axis; said check valve being located in a neck of the pressure cylinder;
   said check valve having a connection opening for gas removal;
   said check valve including a valve tappet for operating said check valve by displacement of said valve tappet along said first central axis;
   a connecting device with a second central axis; said connecting device being connectable in a gas-tight, detachable locking manner with said check valve; said connecting device containing means for displacing said valve tappet of said check valve; and means for mechanically and detachably coupling in a first step the pressure cylinder with said check valve to said connecting device to form a swivel joint with a pivot axis lying at right angles to and outside said first and second central axes and with said first central axis being inclined with respect to said second central axis, said means enabling, in a second step said pressure cylinder with said check valve and said connecting device to be connected in a gas-tight manner in said coupled state by pivoting relative to one another about said pivot axis until said first central axis is in alignment with said second central axis.

2. Connection system according to claim 1, characterized in that the check valve (4) comprises a screw-in cone (28) concentric to the central axis (6) and can be screwed by means of a conical thread (29) on the screw-in cone (28) into the neck (15) of the pressure cylinder (5).

3. Connection system according to claim 2, characterized in that onto the outer end of the screw-in cone (28) is shaped a substantially rectangular connection plate (27) at right angles to the central axis (6) and on whose top is provided the connection opening (30) and that the pivoting axis (33 or 34) is defined by a pair of spigots (31a, b or 32a, b), which are shaped on two opposite sides of the connection plate (27).

4. Connection system according to claim 3, characterized in that on the connection plate are shaped two pairs of spigots (31a, b; 32a, b), which define two arbitrarily usable pivoting axes (33, 34), which are arranged symmetrically to a median plane passing through the central axis (6).

5. Connection system according to claim 2, characterized in that the valve tappet (38) extends from above into the vicinity of the conical thread (29).

6. Connection system according to claim 1, characterized in that the connection opening (30) is constructed as an outwardly opening cone concentric to the central axis (6), that in the wall of the opening cone is provided a concentrically passing round packing ring (56) and that the connecting device (2, 3, 20, 23) comprises a gas removal head, which in its front region is constructed as a plug cone (54) matching the opening cone and on connecting the check valve (4) and connecting device (2, 3, 20, 23) sealingly fits in the opening cone.

7. Connection system according to claim 6, characterized in that on the check valve (4) and on the connecting device (2, 3, 20, 23) are provided coding means (35, 53) allowing a correct connection of pressure cylinder (5) and connecting device (2, 3, 20, 23) only for pressure cylinders matching the connecting device.

8. Connection system according to claim 7, characterized in that the coding means comprise a concavely toothed internal shape (35) positioned concentrically to the central axis (6) in the vicinity of the connection opening (30) and a matching, convexly toothed external shape (53) located in the vicinity of the gas removal head (52).

9. Connection system according to claim 1, characterized in that the connecting device comprises a reducing valve (2) with a spring-loaded diaphragm (48) and that the means for operating the valve tappet (38) comprise a push rod (51) subject to the action of the diaphragm (48) and which acts on the valve tappet (38) on connecting the check valve (4) and connecting device.

10. Connection system according to claim 9 characterized in that the connecting device comprises a fixed installable wall mounting (3) for receiving a pressure cylinder (5) equipped with the check valve (4) and to which is resiliently fixed (59) the reducing valve (2) or manual operating device (23).

11. Connection system according to claim 10, characterized in that the check valve (4) comprises a screw-in cone (28) concentric to the central axis (6) and by means of a conical thread (29) located on the screw-in cone (28) can be screwed into the neck (15) of the pressure cylinder (5), that on the outer end of the screw-in cone (28) is shaped a substantially rectangular connection plate (27) at right angles to the central axis (6) and on whose top is provided the connection opening (30), that the pivoting axis (33 or 34) is defined by a pair of spigots (31a, b or 32a, b), which are shaped on two opposite sides of the connection plate (27), that the wall mounting (3) comprises two parallel support arms (12), which have on their free ends hang-in openings (58), into which can be hung the connection plate (27) by its spigots (31a, b or 32a, b) and in which the connection plate (27) can be pivoted about the pivoting axis (33 or 34) defined by the spigots (31a, b or 32a, b).

12. Connection system according to claim 11, characterized in that on the connection plate are shaped two pairs of spigots (31a, b or 32a, b), which define two randomly usable pivoting axes (33, 34) positioned symmetrically to a median plane passing through the central axis (6) and that on the fastening side of the support arms (12) are provided locking openings (57), in which, on connection, pivot and are lockingly held the pair of spigots (32a, b or 31a, b) not used for pivoting.

13. Connection system according to claim 12, characterized in that for locking purposes a ratchet lever (14) is provided, which is pivotably mounted about a pivoting axis (10) on the wall mounting (3).

14. Connection system according to claim 9 characterized in that the connecting device comprises a mobile mounting (20), on which is resiliently fixed (59) the reducing valve (2) or manual operating device (23) and which can be slipped on the pressure cylinder (5) equipped with the check valve (4).

15. Connection system according to claim 14, characterized in that the check valve (4) comprises a screw-in cone (28) concentric to the central axis (6) and which can be screwed into the neck (15) of the pressure cylinder (5) by a conical thread (29) located on the screw-in cone (28), that on the outer end of the screw-in cone (28) is shaped a substantially rectangular connection plate (27) at right angles to the central axis (6) and on whose top is provided the connection opening (30), that the pivoting axis (33 or 34) is defined by a pair of spigots (31a, b or 32a, b), which are shaped on two opposite sides of the connection plate (27), that the mobile mounting (20) comprises two parallel forks (19) with which the mobile mounting (20) can be engaged on the connection plate (27) with the spigots (31a, b or 32a, b) and in which the mobile mounting (20) is pivotable about the pivoting axis (33 or 34) defined by the spigots (31a, b or 32a, b).

16. Connection system according to claim 17, characterized in that on the connection plate are shaped two pairs of spigots (31a, b, 32a, b), which define two randomly usable pivoting axes (33, 34), which are located symmetrically to a median plane passing through the central axis (6) and that on the side opposite to the forks (19) are provided locking means (17, 18), which on connection pivot and lock by means of the pair of spigots (32a, b or 31a, b) not used for pivoting.

17. Connection system according to claim 1, characterized in that the connecting device is constructed as a manual operating device (23) for opening the check valve (4).

18. Connection system according to claim 17, characterized in that the means for operating the valve tappet (38) comprise a spindle (25).

19. Connection system according to claim 1 characterized in that on the connecting device (2, 3, 20, 23) is provided a gas removal connection (60), which contains a line check valve (62).

* * * * *

UNITED STATES PATENT AND TRADEMARK OFFICE
CERTIFICATE OF CORRECTION

PATENT NO. : 6,000,419
DATED : December 14, 1999
INVENTOR(S) : Ernst Bernhard

It is certified that error appears in the above-identified patent and that said Letters Patent is hereby corrected as shown below:

Column 10, line 48, change "17" to "15"

Signed and Sealed this

Fourteenth Day of November, 2000

Attest:

Q. TODD DICKINSON

*Attesting Officer*   *Director of Patents and Trademarks*